Sept. 20, 1971 K. J. STALLER 3,605,690

PRINTING APPARATUS FOR TRANSFERRING MAGNETIC PARTICLES TO A PAPER

Filed March 18, 1970

INVENTOR
KAREL J. STALLER
BY
[signature]
ATTORNEY

United States Patent Office 3,605,690
Patented Sept. 20, 1971

3,605,690

PRINTING APPARATUS FOR TRANSFERRING MAGNETIC PARTICLES TO A PAPER

Karel J. Staller, Rutherford, N.J., assignor to International Telephone and Telegraph Corporation, Nutley, N.J.

Filed Mar. 18, 1970, Ser. No. 20,712
Int. Cl. G03g *13/00*
U.S. Cl. 118—637 10 Claims

ABSTRACT OF THE DISCLOSURE

A printing apparatus is provided to transfer attaching plastic magnetic particles to a paper, wherein the particles are squeezed between a magnetic drum and a paper using a stretched metallic belt. The metallic belt is heated and moved at the same speed as the paper such that the combination of pressure and heat decreases the melting point of the plastic particles and causes them to be transferred from the drum to the paper.

BACKGROUND OF THE INVENTION

In general this invention relates to transferring magnetic particles from a magnetic recording surface to a paper or record surface, and more particularly to transferring plastic magnetic particles from a high speed magnetic recording surface to paper.

Transfer arrangements for high speed printing apparatus, i.e., that apparatus which can produce 200 lines per second, require arrangements which can efficiently and rapidly transfer the magnetic particles from the recording surface to the paper. Accordingly, radiation heaters and high frequency heaters have been used which consume a considerable amount of power, this is both wasteful and expensive. In order to conserve some of this excess power, the prior art provided means to use the excess power by recirculation so as to preheat the paper. In other arrangements this was also necessary because of the high speed of the printer.

However, an arrangement which utilized the combination of pressure and heat for a longer period would decrease the melting point of the plastic magnetic particles and permit high speed transfer without the excessive power requirements and recirculating means required to preheat the paper.

SUMMARY OF THE INVENTION

It is therefore an object of this invention to provide an arrangement for transferring magnetic particles from a magnetic recording surface to a record.

It is another object of this invention to provide printing transfer apparatus which utilizes the combination of pressure and heat for a predetermined period to cause the transfer of plastic magnetic particles.

According to the broader aspects of the invention the apparatus causes plastic magnetic particles to be squeezed between a magnetic recording surface and a recording paper using a stretched metallic belt which is heated and moves at the same speed as the paper, the combination of pressure and heat decreases the melting point of the magnetic plastic particles and permits the desired rapid transfer.

A feature of the invention is that there is provided a selectively magnetizable recording surface having magnetic particles attached to the magnetized portions thereof, a metallic belt is stretched across said surface at a predetermined location, means is provided for squeezing a paper between said belt and surface, and for applying heat and pressure to said location, and means is positioned for cooling said surface at said location, whereby the combination of pressure and heat combines to cause transfer and fixing said particles on said paper, and a temperature gradient between the recording surface and the paper insures that the particles will not adhere to the recording surface but to the paper.

BRIEF DESCRIPTION OF THE DRAWINGS

The following description will best be understood if reference is made to the accompanying drawings in which.

BRIEF DESCRIPTION OF A PREFERRED EMBODIMENT

Figures 1, 2:
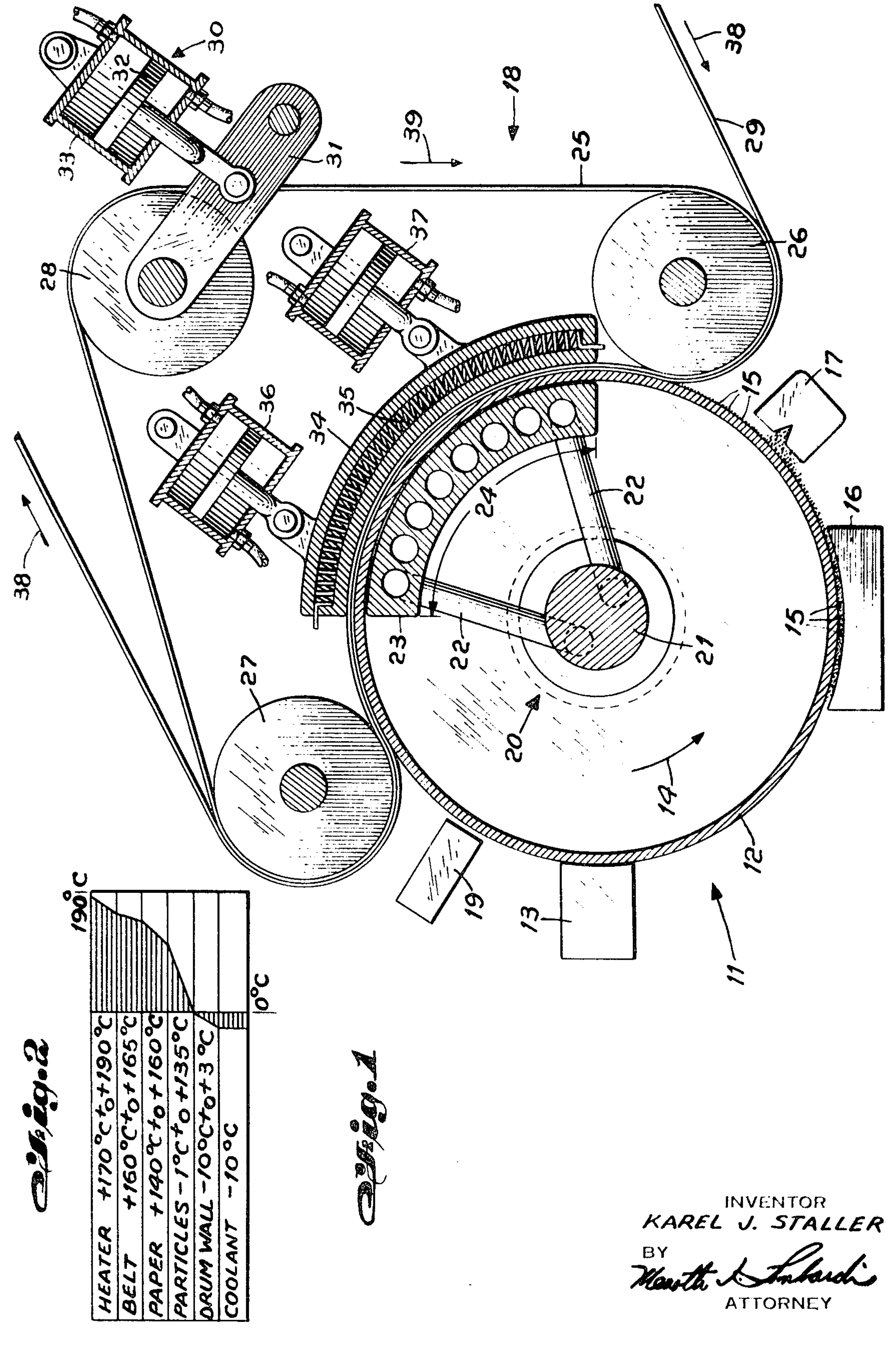
FIG. 1 shows in cross-section a printing apparatus arrangement according to the invention.
FIG. 2 is a chart illustrating the temperature gradient existing along the transfer portion of the apparatus illustrated in FIG. 1.

Referring now to the drawings, FIG. 1 shows a preferred embodiment according to the invention in which a drum 11 is coated with a thin layer of material 12 which can be selectively magnetized by magnetizing means 13. The coating 12, which can be an iron oxide, is magnetized by the means 13 during rotation of the drum 11 in the direction of the arrow 14. Magnetic plastic particles 15 are thrown against the surface of the drum by means 16, these particles will adhere to the magnetized portions of the surface of the drum to form the desired characters as shaped by the magnetizing means 13. The excess particles, which have adhered by static electricity or by adhesion between the desired characters, are removed by cleaning means 17. The characters are then passed through transfer arrangement 18 and the drum is finally demagnetized by means 19 and ready for a new cycle of selective magnetization and prior art.

The novel features of the invention as concerned with the transferring of the particles will now be described. Through the center portion 20 of the drum is a tubular means 21 carrying tubes 22 of coolant through the center portion and around to the transfer area to an inside sector coolant carrier 23, to maintain the transfer portion of the drum at a predetermined temperature. This coolant in tubes 22 and carrier 23 keeps the drum wall in sector 24 at a gradient of $-10°$ C. to $+3°$ C. as shown in FIG. 2. The coolant itself is maintained at approximately $-10°$ C. A metallic belt 25, which may be a beryllium copper belt, is stretched over the pulleys 26, 27 and 28 in an endless loop. One of the pulleys may be driven by a means not shown. A paper 38 is sandwiched between the belt 25 and the drum 11, the paper, drum and belt all moving at the same speed.

It should be noted, that the means to control the relative speeds between the belt, paper, and drum is known and could include any number of timing arrangements, for instance, placing a timing magnetic spot on the drum surface and on the belt, and synchronizing them together for the same speed.

The pressure of the metallic belt 25 stretched over the drum is controlled by a pneumatic means 30 which can selectively increase or decrease the stretching of the belt. Pulley 28 is pivotally mounted to lever arm 31 which is controlled piston 32 within cylinder 33 of pneumatic means 30.

A heater 34 having a heating coil 35 therein, is placed behind the metallic belt 25 in the sector 24. The heater 34 having additional pneumatic means 36, 37 which are controllable to increase the pressure on the paper and help to reduce the heat required to fix particles in sector 24. A further feature of means 36, 37 is that it can withdraw the heater 34 from the belt during non-printing periods. The heater 34 is maintained at a temperature of +170° C. or to 190° C., causing the belt to be maintained at a temperature of 160° C. to +165° C., and the paper thereby to be maintained at a temperature of +140° C. to +160° C. Particles are at a temperature of −1° C. to +135° C. This provides a proper temperature gradient across the transfer area as shown in FIG. 2. The temperature gradient between the paper and drum can be controlled by the heater and coolant so that the particles will not adhere to the drum, but to the hot paper moving in the direction indicated by arrows 38.

This arrangement has additional adjustable features which interact so that the combination of heat and pressure decreases the melting point of the plastic particles and permits rapid transfer and fixing of the particles to the paper. The coolant passes through the coolant carrier 23 located behind the drum surface in sector 24 and is adjustable or can be controlled to a desired temperature. The metallic belt, moving in direction 39, stretches across the transfer area and sandwiches the paper between the drum and belt. The pressure is controlled by means 30. In addition, a heater 34 whose temperature can be controlled exerts added pressure by means 36, 37 and aids in controlling the temperature-pressure combination required to effectively transfer and fix the particles on the drum to the paper.

It should be understood that the foregoing description of a specific embodiment of this invention is made by way of example only and should not be considered as a limitation to the scope of the invention as set forth in the objects and features thereof and in the accompanying claims.

I claim:

1. Printing apparatus comprising:
- a selectively magnetizable recording surface having magnetic particles attached to the magnetized portions thereof;
- a metallic belt stretched across a portion of said surface;
- means for squeezing a paper between said belt and said surface portion;
- means for applying heat and pressure to said portion of said surface;
- means for cooling said portion of said surface;
- whereby the combination of pressure and heat combine to cause transfer and fixing of said magnetic particles.

2. The apparatus according to claim 1 wherein the means for squeezing include a plurality of rollers forming said belt in an endless loop, and a pressure means coupled to control at least one of said rollers.

3. Means for apparatus of claim 1 wherein the means for heating and applying pressure include a heater which is pressed against said belt by another pressure means.

4. The printing apparatus according to claim 1 wherein the means for cooling include means positioned opposite said heating and pressure means for passing a coolant adjacent said surface portion to maintain a temperature gradient between said paper and surface.

5. Printing apparatus for transferring magnetic plastic particles to a paper comprising:
- a selectively magnetizable recording surface;
- a metallic belt stretched across a portion of said surface where transfer of the particles is to be made;
- means for squeezing the paper between said belt and surface;
- means for cooling said recording surface in the area of transfer of said particles; and
- means for applying heat and additional pressure to said paper at the transfer location, whereby the combination of pressure and heat combine to cause the plastic particles to adhere to said paper and be fixed thereto.

6. The apparatus according to claim 5 wherein the means for squeezing include a plurality of rollers forming said belt in an endless loop, and a pressure means coupled to control at least one of said rollers.

7. Means for apparatus of claim 6 wherein the means for heating and applying pressure include a heater which is pressed against said belt by another pressure means.

8. The printing apparatus according to claim 7 wherein the means for cooling include means positioned opposite said heating and pressure means for passing a coolant adjacent said recording surface at the transfer location to maintain a temperature gradient between said paper and surface.

9. Printing apparatus for transferring magnetic plastic particles to a paper comprising:
- a selectively magnetizable drum having a plurality of plastic magnetic particles attached to the magnetized portion of its surface;
- a metallic belt stretched across a portion of said drum surface where transfer of the particles is made;
- means for squeezing a paper between said belt and drum;
- means for cooling said drum at the area of transfer of said particles; and
- means for applying heat and additional pressure to said paper at the area of transfer of said particles, whereby the combination of pressure and heat combine to cause the plastic particles to adhere to said paper and be fixed thereto.

10. The apparatus according to claim 9 wherein said metallic belt is a beryllium copper belt formed in a continuous loop.

References Cited

UNITED STATES PATENTS

| | | | |
|---|---|---|---|
| 2,681,612 | 6/1954 | Reimann | 101—25 |
| 2,841,461 | 7/1958 | Gleason | 346—74 |
| 3,374,769 | 3/1968 | Carlson | 118—641 |

MERVIN STEIN, Primary Examiner
L. MILLSTEIN, Assistant Examiner